United States Patent
Neumann et al.

(10) Patent No.: US 6,926,062 B2
(45) Date of Patent: Aug. 9, 2005

(54) SCREEN ELEMENT FOR MOTOR VEHICLES; IN PARTICULAR, WIND BLOCKER

(75) Inventors: Peter Neumann, Oberstenfeld (DE); Joerg Riehle, Asperg (DE); Matthias Goetz, Markgroeningen (DE); Hermann Maeurle, Stuttgart (DE)

(73) Assignee: ORIS Fahrzeugteile Hans Riehle GmbH, Moeglingen (DE)

(*) Notice: Subject to any disclaimer, the term of this patent is extended or adjusted under 35 U.S.C. 154(b) by 0 days.

(21) Appl. No.: 10/253,405

(22) Filed: Sep. 23, 2002

(65) Prior Publication Data

US 2003/0085006 A1 May 8, 2003

Related U.S. Application Data

(63) Continuation-in-part of application No. 09/804,488, filed on Mar. 12, 2001, now abandoned, and a continuation-in-part of application No. 10/004,273, filed on Oct. 23, 2001, now Pat. No. 6,582,008.

(30) Foreign Application Priority Data

Mar. 13, 2000 (DE) .......................................... 100 12 166
Oct. 24, 2000 (DE) .......................................... 100 53 701

(51) Int. Cl.[7] ................................................ A47G 5/00
(52) U.S. Cl. ................ 160/371; 160/370.21; 296/180.1
(58) Field of Search ............................ 160/371, 370.21, 160/370.22, 370.23, 127, 351, 369, 395, 380, 402; 296/180.1, 180.5, 97.7, 97.9

(56) References Cited

U.S. PATENT DOCUMENTS

| | | | | |
|---|---|---|---|---|
| 1,476,565 A | * | 12/1923 | Yeager | 160/184 |
| 2,780,693 A | * | 2/1957 | McClellan | 200/86 R |
| 3,053,566 A | * | 9/1962 | Allen | 296/106 |
| 3,220,469 A | | 11/1965 | Oehmig | |
| 3,839,950 A | * | 10/1974 | Kelly et al. | 454/145 |
| 3,930,680 A | * | 1/1976 | Littlefield | 296/10 |
| 4,174,585 A | * | 11/1979 | Beesley | 43/55 |
| 4,232,310 A | * | 11/1980 | Wilson | 340/550 |
| 4,242,823 A | * | 1/1981 | Bruno | 40/621 |
| 4,486,302 A | | 12/1984 | Jorgensen | |
| 4,501,782 A | | 2/1985 | Weatherly et al. | |
| 4,690,040 A | * | 9/1987 | Barnett | 454/136 |

(Continued)

FOREIGN PATENT DOCUMENTS

| | | |
|---|---|---|
| DE | 88 05 994 | 9/1988 |
| DE | 40 39 485 | 5/1992 |
| DE | 43 15 201 | 2/1994 |

(Continued)

*Primary Examiner*—Bruce A. Lev
(74) *Attorney, Agent, or Firm*—Lipsitz & McAllister, LLC

(57) ABSTRACT

A screen element for motor vehicles having a piece of flat material extending in a surface area. The piece of flat material has strands which are inherently stiff to enable the flat material to stand alone without a frame. The strands also provide primary stability for the screen element. A frame on at least one edge area of the piece of flat material provides secondary stability for the screen element.

33 Claims, 13 Drawing Sheets

U.S. PATENT DOCUMENTS

| | | | |
|---|---|---|---|
| 5,097,886 A | * 3/1992 | Moyet-Ortiz | ............ 160/368.1 |
| 5,116,273 A | 5/1992 | Chan | |
| 5,195,799 A | 3/1993 | Goetz et al. | |
| 5,211,718 A | 5/1993 | Goetz et al. | |
| 5,219,201 A | 6/1993 | Goetz et al. | |
| 5,301,737 A | 4/1994 | Martin | |
| 5,310,482 A | * 5/1994 | Sather | ......... 210/485 |
| 5,318,337 A | 6/1994 | Goetz et al. | |
| 5,338,089 A | 8/1994 | Goetz et al. | |
| 5,368,356 A | 11/1994 | Goetz et al. | |
| 5,411,318 A | * 5/1995 | Law | ......... 297/452.45 |
| 5,423,589 A | 6/1995 | Pank | |
| 5,535,804 A | 7/1996 | Guest | |
| 5,535,808 A | 7/1996 | Idesis et al. | |
| 5,588,359 A | 12/1996 | Hofmann et al. | |
| 5,645,311 A | 7/1997 | Emmer et al. | |
| 5,702,150 A | 12/1997 | Reuter et al. | |
| 5,707,099 A | 1/1998 | Schrader et al. | |
| 5,732,760 A | * 3/1998 | Pattison | ............ 160/371 |
| 5,738,404 A | 4/1998 | Stadler et al. | |
| 5,810,424 A | 9/1998 | Kuttner et al. | |
| 5,819,952 A | 10/1998 | Cook et al. | |
| 5,899,521 A | 5/1999 | Pfertner et al. | |
| 6,092,860 A | 7/2000 | Zankl et al. | |
| 6,109,331 A | 8/2000 | Story, Jr. | |
| 6,125,910 A | 10/2000 | Pepperell et al. | |
| 6,135,193 A | * 10/2000 | Lloyd | ............ 160/370.23 |
| 6,179,373 B1 | 1/2001 | Bohm et al. | |
| 6,247,264 B1 | * 6/2001 | Prosol | ......... 43/100 |
| 6,247,518 B1 | * 6/2001 | Wickersty | ............ 160/105 |
| 6,263,949 B1 | 7/2001 | Guthrie, Jr. | |
| 6,267,128 B1 | * 7/2001 | Zheng | ......... 135/126 |
| 6,338,223 B1 | * 1/2002 | Stahl | ........... 49/463 |
| 6,352,300 B1 | 3/2002 | Beal | |
| 6,378,930 B1 | 4/2002 | Brettmann | |
| 6,491,052 B1 | * 12/2002 | Zheng | ......... 135/125 |
| 6,582,008 B2 | * 6/2003 | Riehle et al. | ............ 296/180.1 |
| 2001/0034169 A1 | * 10/2001 | Goetz et al. | ............ 442/6 |
| 2002/0027372 A1 | 3/2002 | Currie et al. | |

FOREIGN PATENT DOCUMENTS

| | | | | |
|---|---|---|---|---|
| DE | 04239478 | * | 5/1994 | ............ 160/371 X |
| DE | 44 46 764 | | 6/1996 | |
| DE | 195 02 794 | | 8/1996 | |
| DE | 195 21 234 | | 9/1996 | |
| DE | 19521234 | * | 9/1996 | ............ 160/371 X |
| DE | 195 34 584 | | 9/1996 | |
| DE | 195 16 921 | | 11/1996 | |
| DE | 196 02 598 | | 3/1997 | |
| DE | 195 36 552 | | 4/1997 | |
| DE | 195 45 405 | | 6/1997 | |
| DE | 196 16 448 | | 11/1997 | |
| DE | 196 32 352 | | 2/1998 | |
| DE | 197 27 510 | | 1/1999 | |
| DE | 197 28 453 | | 1/1999 | |
| DE | 197 31 326 | | 1/1999 | |
| DE | 298 22 230 | | 4/1999 | |
| DE | 299 13 249 | | 2/2000 | |
| DE | 199 06 650 | | 8/2000 | |
| EP | 0 394 675 | | 10/1990 | |
| EP | 0 490 213 | | 6/1992 | |
| EP | 0 887 217 | | 12/1998 | |
| EP | 1 010 561 | | 6/2000 | |
| GB | 235477 | | 6/1925 | |
| WO | 97/04976 | | 2/1997 | |

\* cited by examiner

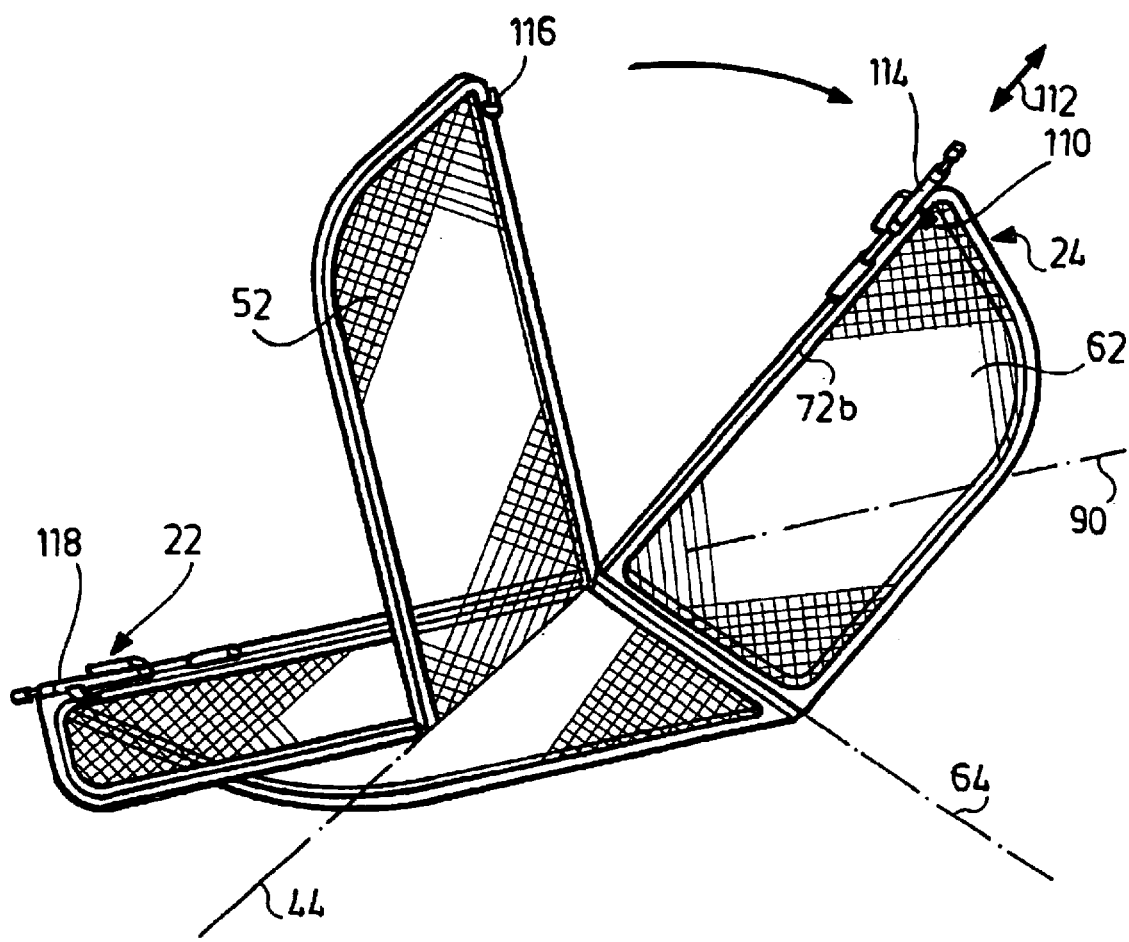

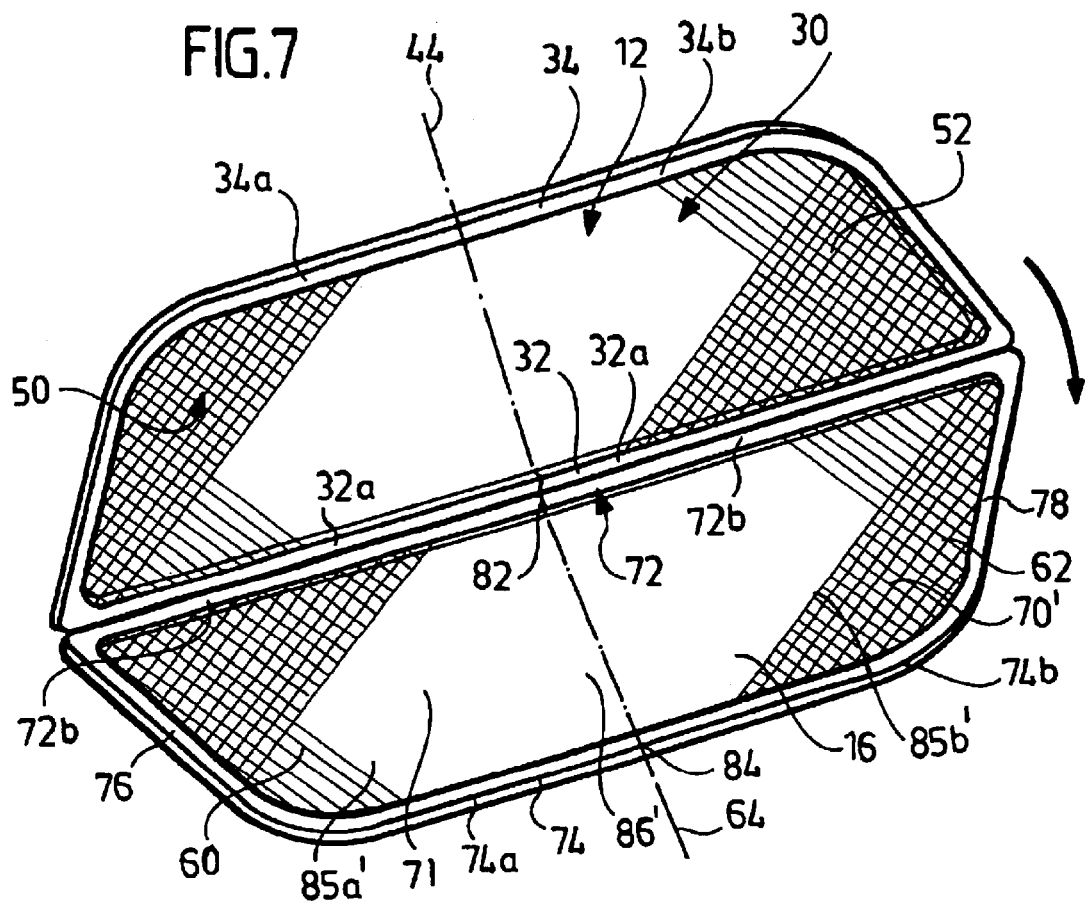
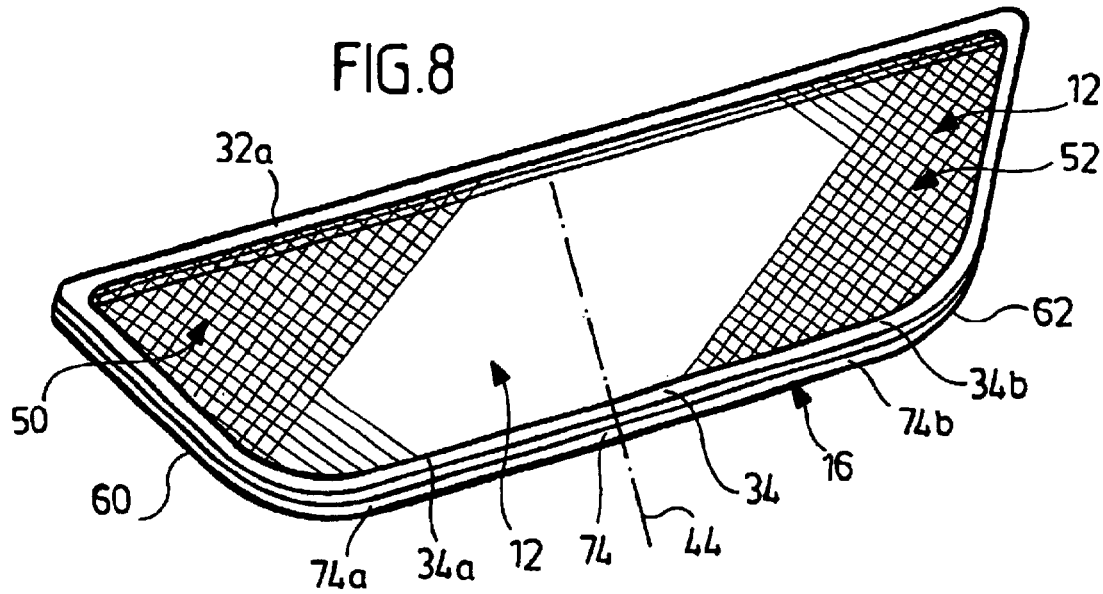

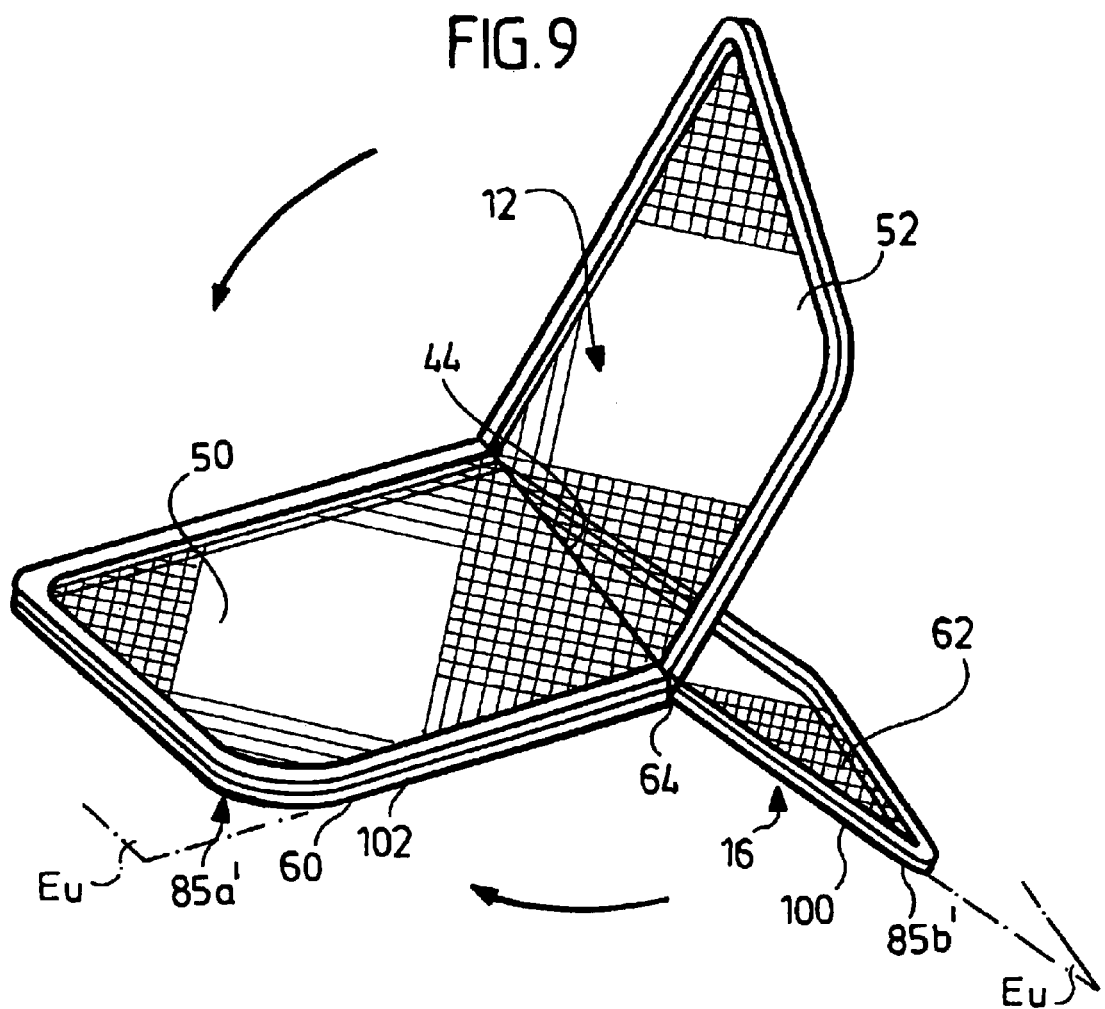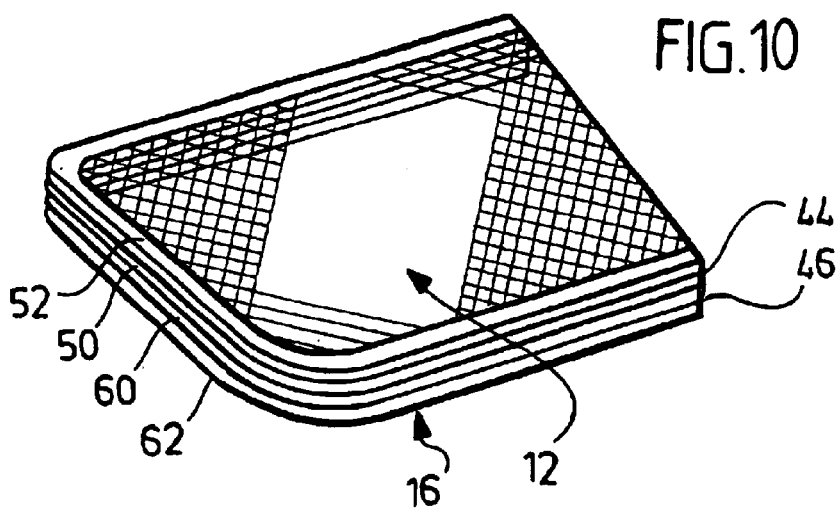

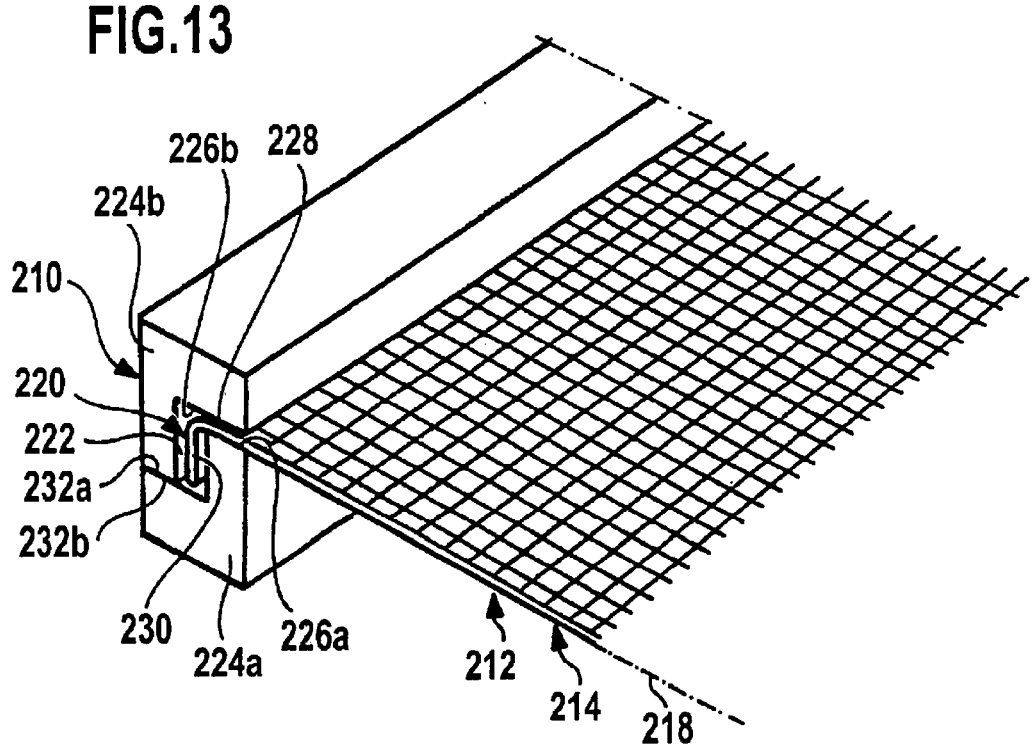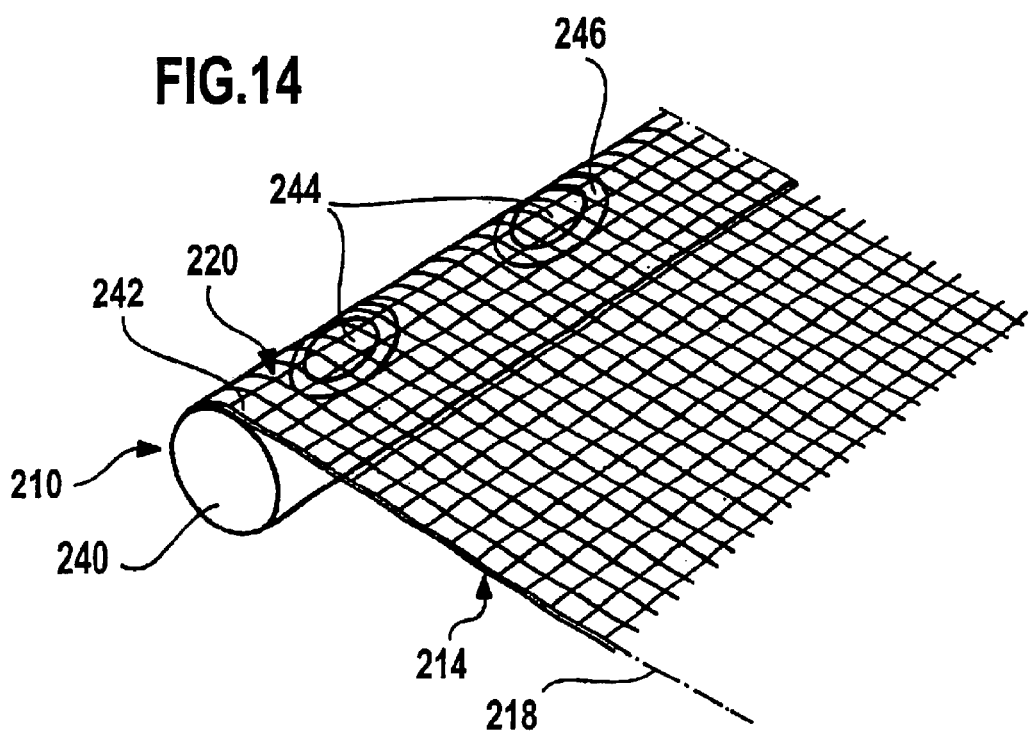

SCREEN ELEMENT FOR MOTOR VEHICLES; IN PARTICULAR, WIND BLOCKER

This application is a continuation-in-part of U.S. patent application Ser. Nos. 09/804,488 filed Mar. 12, 2001 now abandoned and 10/004,273 filed Oct. 23, 2001 now U.S. Pat. No. 6,582,008.

BACKGROUND OF THE INVENTION

The invention relates to a screen element for motor vehicles, in particular, a wind blocker or a sun screen, comprising a piece of flat material extending in a surface area.

In screen elements known to date for motor vehicles, a flexible material clamped in a frame has been used for the piece of flat material in order, for example, to prevent a wind blocker from fluttering.

However, such a flexible flat material has the disadvantage that it has to be firmly attached to a frame and also has to be clamped therein.

The object underlying the invention is, therefore, to so improve a screen element of the generic kind that it can be manufactured more economically.

SUMMARY OF THE INVENTION

This object is accomplished in accordance with the invention with a screen element of the kind described at the outset by the piece of flat material comprising a woven, knitted or braided fabric consisting of inherently stiff wires or fibers and thus being of inherently rigid construction.

The advantage of the solution according to the invention is to be seen in that such a piece of flat material already exhibits such a sufficient inherent rigidity that the stability does not have to be primarily ensured by the frame.

Furthermore, such a piece of flat material has the advantage that the tensioned mounting of the piece of flat material on the frame, which involves high expenditure, can be dispensed with.

Such a piece of flat material for a wind blocker or a sun screen for motor vehicles is preferably produced from a woven, knitted or braided fabric consisting of wires which are so thin that it allows one to see through it, so that, for example, in the case of a wind blocker one can still look through the screen element with the rearview mirror.

Regarding the structure of the wires or fibers, it is, for example, conceivable to use carbon fibers, which are likewise inherently stiff.

Such carbon fibers do, however, have the disadvantage that they do not allow subsequent shaping. For this reason, it is particularly advantageous for the wires or fibers to be produced from a shapeable material, but which is nevertheless inherently stiff, so that it is possible not only to spread out the flat material in a plane but also to give the flat material, for example, a curved shape.

It is, for example, conceivable to also use plastic wires or fibers which, for example, are thermoplastically shapeable.

However, a particularly expedient solution makes provision for the wires to be made of metal, for these, on the one hand, to be shapeable in a simple way by known methods, but, on the other hand, to also exhibit a sufficiently high degree of inherent stiffness.

Since, with the solution according to the invention, the piece of flat material itself has a sufficiently high degree of inherent rigidity, it is, in principle, not necessary to provide a separate frame.

However, to achieve an improved edge rigidity and hence an improved handling of the screen element, provision is preferably made for the wires or fibers in an edge area of the piece of flat material to extend at least partially transversely to the surface area in which the piece of flat material extends.

This results in a particularly simple way in an additional edge stiffening so that the total stability of the screen element does not have to result from the inherent stability of the piece of flat material itself, but rather the edge area extending at least partially transversely to the surface area forms a stabilizing frame around the piece of flat material.

An embodiment of such a screen element makes provision for the wires in the edge area to be shaped so as to form a surrounding edge loop.

A further advantageous embodiment makes provision for the wires in the edge area to be shaped so as to form a bead.

In conjunction with the embodiments explained so far it is assumed that the additionally stabilizing frame is formed from the edge area of the piece of flat material itself.

However, a further advantageous embodiment makes provision for the piece of flat material to have an edge area which has a frame connected thereto.

Such an additional frame has the advantage that it is possible to create in the edge area a closure around the screen element, which is advantageous with respect to appearance and technical safety so that, in particular, there is no necessity for complicated machining of the edge area in order to achieve a closure which is acceptable with respect to appearance and technical safety.

Furthermore, an additional frame has the advantage that it also offers the possibility, in the simple, conventional way, of implementing the holder of the screen element on the motor vehicle with conventional holding elements engaging at the edge.

However, the great advantages of the inherently rigid piece of flat material are nevertheless still present in this embodiment. These are, on the one hand, that the necessity of tensioning the piece of flat material is dispensed with, and, on the other hand, that in addition to its inherent rigidity, the piece of flat material is also adaptable to any surface shapes which differ from a level surface.

Such a frame can be implemented in many different ways. One advantageous embodiment makes provision for the frame to comprise at least one frame part positioned on the edge area.

Such a frame part can be fixed on the edge area in many different ways. It is, for example, conceivable to simply hold the edge area in a positively locking manner on the frame part, for example, by means of a recess provided in the frame part. In the simplest case, the recess can be implemented by two frame parts connectable to each other, with the edge area being inserted into the recess when the frame parts are fitted together.

The frame parts are preferably attached to each other, for example, by an adhesive or welding connection.

A particularly advantageous solution makes provision for the edge area to be embedded in a frame part at least in connecting areas. Such embedding can be achieved by, for example, the frame part being softened in individual frame part elements so as to embed the edge area of the piece of flat material.

Such softening of the frame part can be advantageously carried out in that, in order to create the connecting areas, the frame part made of thermoplastic material is acted upon by ultrasound to heat up and soften the thermoplastic material, so as to thus achieve an embedding of the edge area in the individual connecting areas.

Another advantageous embodiment of the screen element according to the invention makes provision for the frame to be injection molded onto the edge area, i.e., the edge area is placed in an injection mold and injection molding is performed around the edge area.

As an alternative to this, provision is made for the frame to be foamed onto the edge area.

In another embodiment of the invention the screen element for motor vehicles comprises a stabilizing structure extending in a surface area, and comprising a web structure having openings between webs thereof and providing stability to the screen element, and a piece of flat material, maintained by the stabilizing structure in a position in which it extends over the said surface area within an outer contour of the stabilizing structure.

The advantage of this embodiment is to be seen in the fact that the stabilizing structure itself can provide sufficient stability to the screen element in order to maintain the piece of flat material extending over the said surface area. In particular, such a stabilizing structure makes it unnecessary to provide a stable frame which itself has to provide the stability for the screen element and is therefore expensive. In accordance with the present invention the stabilizing structure with the web structure can be manufactured much more cost effectively.

No specific details have been given regarding the shape of the outer contour of the stabilizing structure outlined above.

In particular, it is of advantage for the stabilizing structure to comprise an outer rim element connected to the web structure.

A further advantageous embodiment provides that the stabilizing structure comprises an outer frame connected to the web structure.

In particular, the outer frame can be formed by the rim element of the stabilizing structure and a further frame element, for example, a cover element for the rim.

The stabilizing structure can be designed in a variety of ways. One embodiment provides that the stabilizing structure comprises webs interconnected with one another.

In particular, the webs are interconnected at points of intersection thereof.

The webs may be designed in any way which allows formation of a web structure.

According to one advantageous embodiment the stabilizing structure comprises crossovers forming the webs of the web structure. Such crossovers can be formed like bars or rods or legs or arms.

In a specific embodiment it is provided that at least some of the webs extend parallel to each other. Such an embodiment has the advantage that the plurality of webs can be used to increase the stability of the stabilizing structure.

An advantageous variant of a screen element provides a first number of webs extending parallel to one direction and a second number of webs extending parallel to a second direction, with the second direction extending transversely to the first direction. Such a web structure results in a grid-like structure which provides the stabilizing structure with a high degree of stability.

In particular, it is of advantage for the first and second directions to extend transversely to supports forming the rim.

In one embodiment it is provided that the web structure is formed as an integral part. This means that the webs of the web structure are interconnected with each other in order to form the integral part.

A further advantageous embodiment provides that the stabilizing structure is formed as an integral part. This means that the web structure as well as the rim element are formed as an integral part.

No specific details have been given regarding fixation of the piece of flat material with respect to the stabilizing structure. One embodiment provides that the piece of flat material is fixed to the rim element of the stabilizing structure.

Such fixation of the flat material is possible in different ways. For example, it is possible to fix the flat material on the rim element by gluing or welding or clamping.

In one specific embodiment the rim element is provided with a receiving means for an outer edge portion of the piece of flat material.

In particular, it is of advantage to maintain the outer edge portion of the piece of flat material in the receiving means by an insert.

Such an insert can be any kind of element specifically adapted to be inserted into the receiving means. One embodiment provides that the insert is part of a cover element covering the rim element.

No details have been given regarding the relative arrangement of the web structure and the piece of flat material. One embodiment provides that the web structure extends on at least one side of the piece of flat material.

A specific embodiment is designed such that the flat material extends in a first surface and the web structure extends in a second surface which is different from the first surface.

In particular, the first surface and the second surface extend essentially parallel to each other.

In general, there can be provided one web structure and one piece of flat material at one side thereof.

An alternative embodiment could also provide two pieces of flat material on opposite sides of one web structure or a further embodiment could provide two web structures and the piece of flat material arranged therebetween.

No details have been given regarding the relative position of the web structure and the piece of flat material.

One embodiment provides that the piece of flat material abuts on one side of the web structure.

Another advantageous embodiment provides arrangement of the piece of flat material with a spacing between the piece of flat material and the web structure. Such a spacing between the piece of flat material and the web structure has the advantage that the optical appearance of the piece of flat material, which usually is a very thin material, is not affected by the web structure. Such a solution offers the advantage that the quality of the surfaces of the web structure directed towards the piece of flat material has no influence on the optical appearance of the piece of flat material and therefore there is a higher degree of freedom with respect to precision and design of the web structure.

No specific details of the piece of flat material have been given. For example, the piece of flat material could be made of stiff material, in particular, material which comprises strands or fibers which are stiff.

However, with use of a stabilizing structure enough stability is provided to keep the piece of flat material extended. In such a case, an advantageous embodiment provides that the piece of flat material is made of a material with bending slackness.

Such a piece of flat material can be made of a wind-tight material.

Such a wind-tight material can be made of an air impermeable foil.

However, since wind stop devices always use an air permeable material for a wind blocker one advantageous embodiment provides that the piece of flat material is made of an air permeable material provided with openings.

These openings are much smaller than the openings of the web structure. In particular the openings in the web structure are of such size that the web structure is not even wind-tight.

For example, the openings in the web structure are larger by more than a factor of 100 or even a factor of 1000 than the openings in the piece of flat material.

There are various possibilities for design of the the piece of flat material. One possibility provides that the flat material comprises at least one of a woven, knitted or braided fabric.

Another possibility provides that the piece of flat material comprises a foil provided with openings.

In order to provide the piece of flat material with an advantageous appearance the piece of flat material is made of elastic material which can be tensioned in at least one direction.

Another possibility would be to make the piece of flat material from an inelastic material.

Further features and advantages of the solution according to the invention are the subject matter of the following description and the drawings of several embodiments.

BRIEF DESCRIPTION OF THE DRAWINGS

FIG. 6 shows a partially folded out illustration of the first embodiment of the wind stop device with illustration of one embodiment of a releasable connection for one of the wind blocker parts and one of the cover parts;

FIG. 7 shows an illustration similar to FIG. 2 of a second embodiment of an wind stop device;

FIG. 8 shows an illustration similar to FIG. 3 of the second embodiment of the wind stop device;

FIG. 9 shows an illustration similar to FIG. 4 of the second embodiment of the wind stop device and FIG. 10 shows an illustration similar to FIG. 5 of the second embodiment of the wind stop device.

FIG. 13 a perspective section along line 13—13 in FIG. 11;

FIG. 14 a section similar to FIG. 13 through a second embodiment;

DETAILED DESCRIPTION OF THE INVENTION

Figure 1:
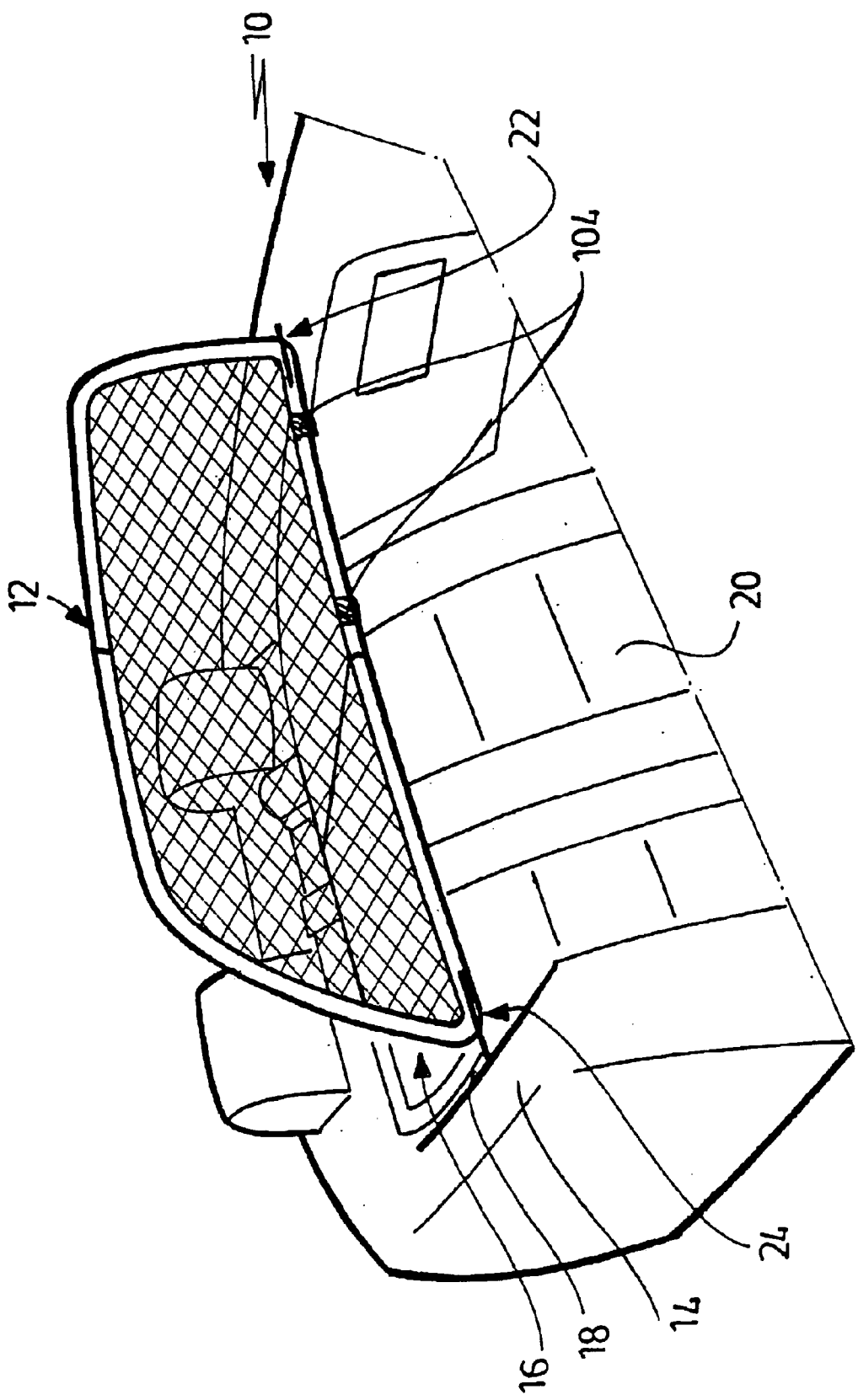
FIG. 1 shows a sectional illustration of a body of a convertible vehicle with a first embodiment of a wind stop device mounted thereon in a functional position.
Figure 2:
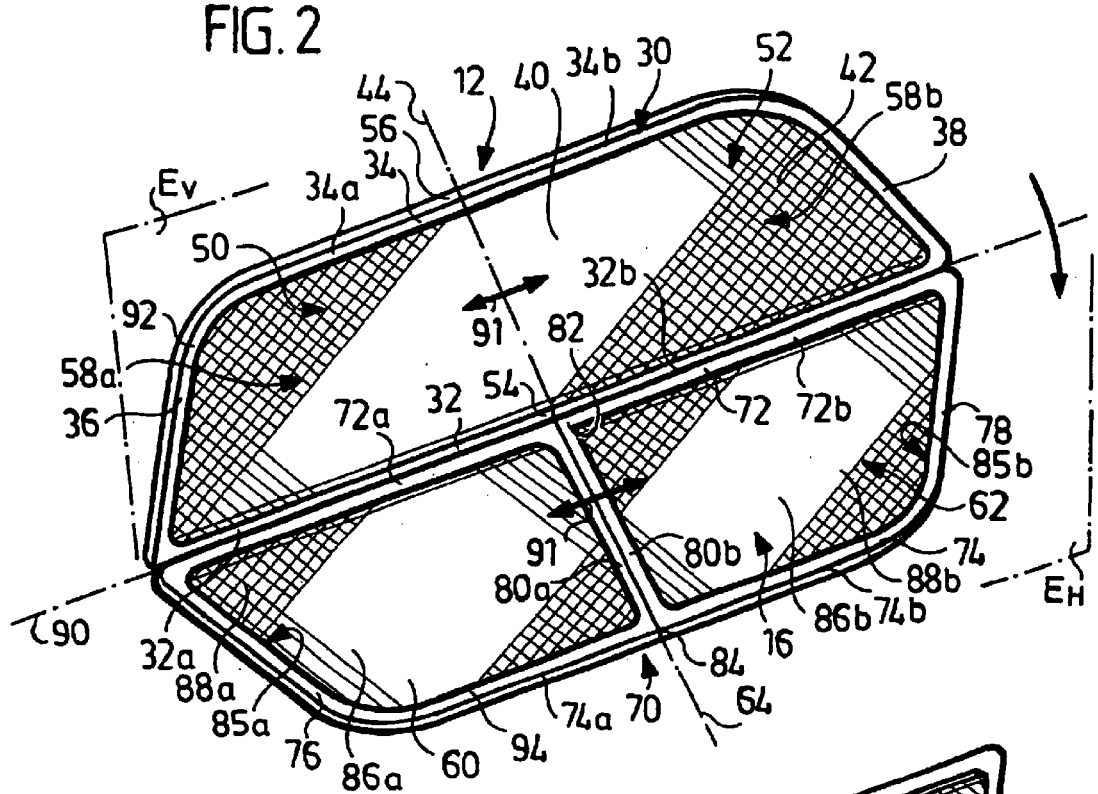
FIG. 2 shows an illustration of the first embodiment of the wind stop device considered in the direction of arrow A in FIG. 1.

A wind stop device for a motor vehicle, the body 10 of which is illustrated in sections in FIGS. 1 and 2, comprises a wind blocker 12 which projects upwards beyond a belt line 14 of the body 10 of the convertible vehicle as well as a cover 16 which covers a section 18 located behind the wind blocker 12 of a passenger compartment opening located at the level of the belt line 14, for example, this is a section 18 located above rear seats 20, wherein the wind blocker 12 is essentially arranged directly behind headrests of front seats of the body 10 which are not illustrated.

The cover 16 is preferably articulatedly connected to the wind blocker 12 and both can be connected to the body 10 in the area of the belt line 14 via fixing devices 22, 24, wherein the fixing devices 22, 24 are arranged either on the wind blocker 12 or on the cover 16, as will be explained in greater detail in the following.

The wind blocker 12 is formed by a wind blocker frame 30 which has a lower frame support 32 and an upper frame support 34 and outer connecting supports 36, 38 connecting the lower frame support 32 and the upper frame support 34 to one another, these connecting supports each connecting outer end areas of the lower frame support 32 and the upper frame support 34 to one another so that the frame 30 encloses a frame opening 40.

A flat material 42 extends in the frame opening 40, is held on the wind blocker frame 30 and is preferably held by the wind blocker frame 30.

In order to form two wind blocker parts 50 and 52 of the wind blocker 30 which can be pivoted relative to one another about a wind blocker folding axis 44, the lower frame support 32 and the upper frame support 34 are provided approximately centrally with a respective hinge 54 and 56, the hinge axes of which are arranged coaxially to the wind blocker folding axis 44.

As a result, the lower frame support 32 and the upper frame support 34 each comprise two frame support parts 32a, b or 34a, b separated by the hinges 54 and 56. The frame support parts 32a, 34a form with the connecting support 36 a C-shaped wind blocker frame part 58a while the frame support parts 32b and 34b with the connecting support 38 form a C-shaped wind blocker frame part 58b and both wind blocker frame parts 58a, b border on the wind blocker folding axis 44 with their open sides.

Furthermore, the cover 16 comprises two cover parts 60 and 62 which can be folded relative to one another about a common cover folding axis 64.

The cover 16 also preferably comprises a cover frame 70 which, in this embodiment, comprises a front frame support 72 and a rear frame support 74, the two being connected to one another by outer connecting supports 76 and 78. Furthermore, inner connecting supports 80a and 80b are provided which extend on both sides of the cover folding axis 64 and likewise connect the front frame support 72 and the rear frame support 74 to one another, wherein the front frame support 72 and the rear frame support 74 are separated along the cover folding axis 64 and likewise preferably connected to one another by means of hinges 82 and 84 which are arranged with their hinge axes coaxially to the cover folding axis 64.

It is, however, also possible to arrange the hinges 82 and 84 in the area of the inner connecting supports 80a and 80b and thus configure the connecting supports 80a and 80b so as to be foldable relative to one another about the cover folding axis 64.

As a result, the inner connecting support 80a and the outer connecting support 76 form a frame section 85a together with a front frame support part 72a extending between them and the rear frame support part 74a extending between them and the inner connecting support 80b forms a further frame section 85b with the outer connecting support 78 and a front frame support part 72b extending between them and a rear frame support part 74b, wherein each frame section 85a and 85b surrounds a frame opening 86a, 86b, over which a flat material 88a and 88b, respectively, extends, wherein the flat material is preferably held by the frame sections 85a and 85b, respectively.

In the functional position of the wind stop device, the wind blocker parts 50 and 52 are in an extended position and have a maximum extension in a direction of extension 91 parallel to the connection folding axis 90. Furthermore, the cover parts 60 and 62 are also in an extended position and likewise have a maximum extension in the direction of extension 91.

Furthermore, the wind blocker 12 is connected to the front frame support 72 of the cover 16 with its lower frame support 32, wherein this connection is preferably a connection which can be pivoted about a connection folding axis 90 extending transversely to a longitudinal direction of the vehicle and which, as will be explained in detail in the following, can be realized in the most varied of ways.

In the functional position of the wind stop device illustrated in FIGS. 1 and 2, the two wind blocker parts 50 and 52 located in the extended position are aligned relative to one another in such a manner that they are approximately located in a plane $E_V$ which extends approximately vertically, wherein the term approximately vertically comprises an angular deviation of plus/minus 30° in relation to the exactly vertical direction.

The plane $E_V$ is located transversely to a plane $E_H$, in which the cover parts 60 and 62 are located in the functional position of the wind stop device, wherein the plane $E_H$ extends approximately parallel to the belt line 14 of the body 10 in the section 18.

Figure 3:
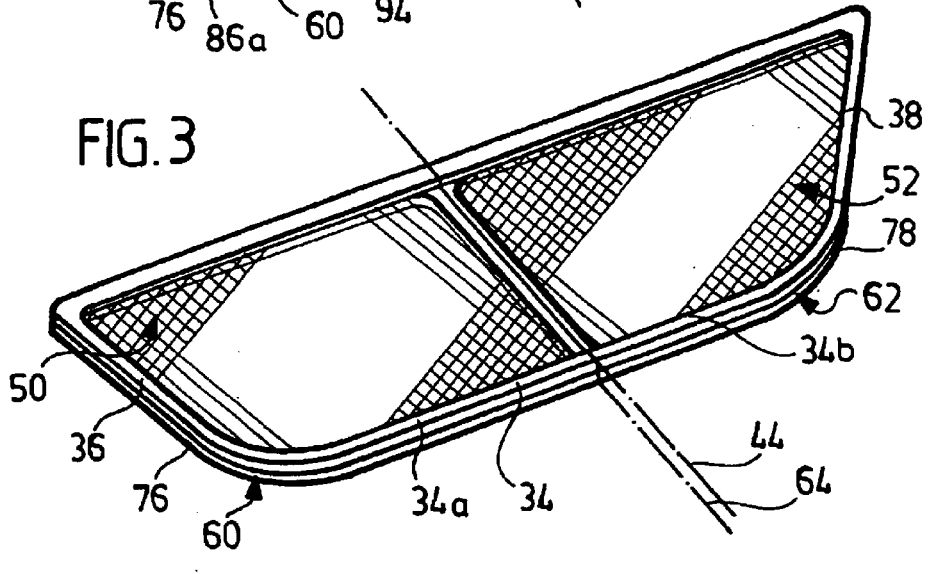
FIG. 3 shows an illustration of the first embodiment of the wind stop device during folding about a connection folding axis.

In order to fold the inventive wind stop device together, the wind blocker 12 and the cover 16 may be folded towards one another about the connection folding axis 90 such that a rear side 92 of the wind blocker 12 is located on an upper side 94 of the cover 16, wherein for this purpose no folding about either the wind blocker folding axis 44 or the cover folding axis 64 need have taken place (FIG. 3).

Figure 4:
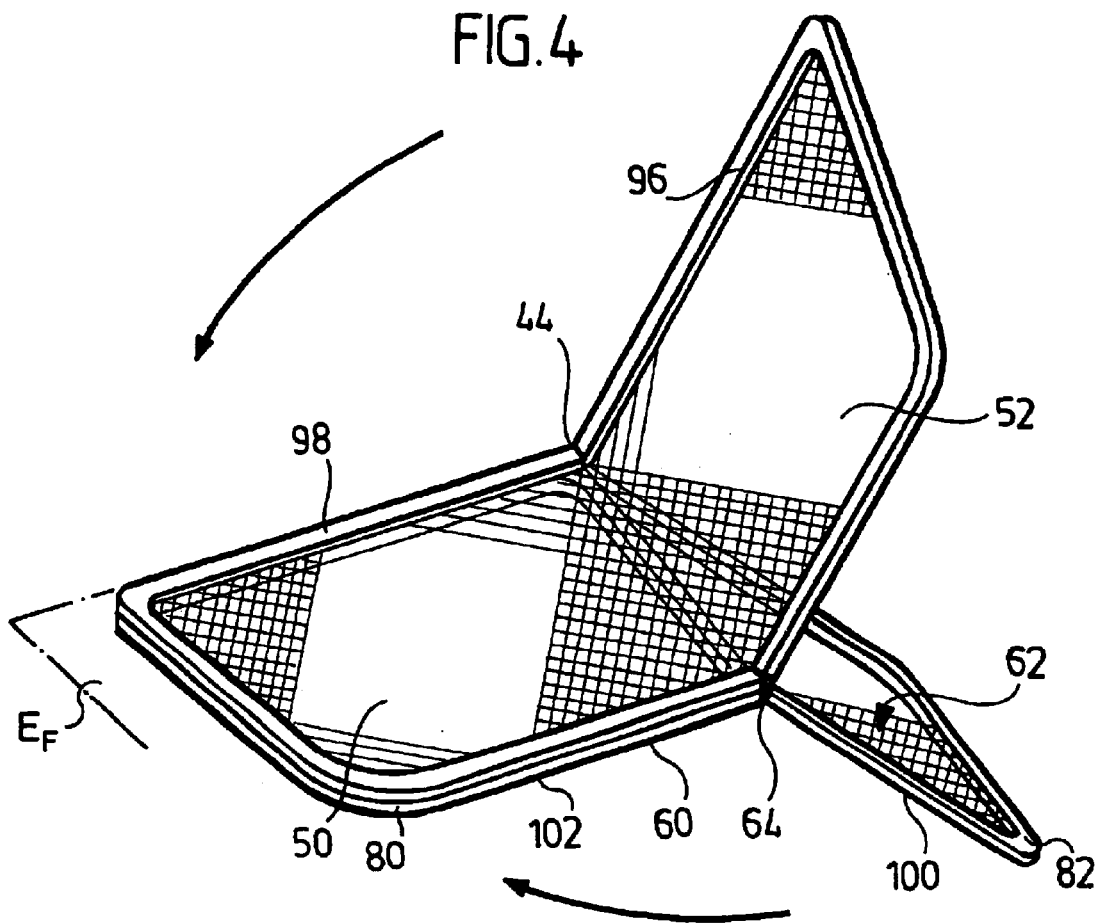
FIG. 4 shows a schematic illustration of further steps for the folding together of the wind stop device.
Figure 5:
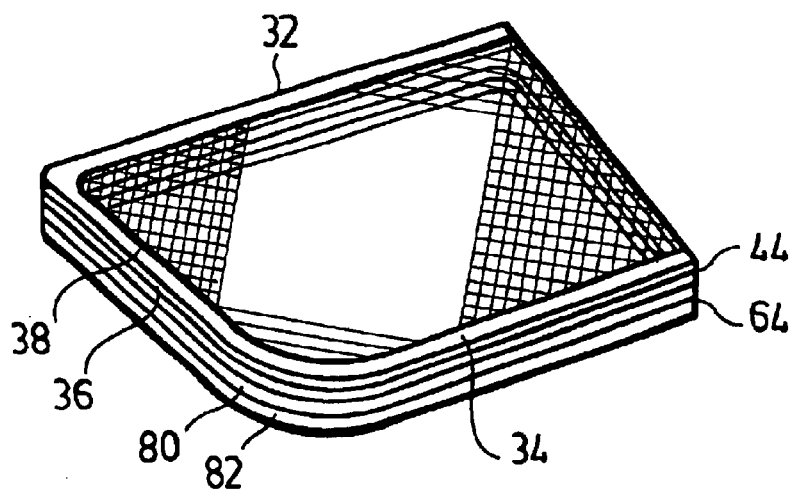
FIG. 5 shows a perspective illustration of the first embodiment of the wind stop device in a folded position.

Moreover, as illustrated in FIG. 4, it is possible to fold one of the wind blocker parts 50 or 52, for example, the wind blocker part 52 about the wind blocker folding axis 44 such that a front side 96 of the wind blocker part 52 is located on a front side 98 of the wind blocker part 50, as illustrated in FIG. 5.

In order to configure this folding as simply as possible, the flat material 42 is located each time in a surface area, preferably a plane $E_F$, which essentially coincides approximately with the respective front side 96, 98 of the wind blocker parts 50, 52 and the wind blocker folding axis 44 is also preferably located in a line of intersection of these surface areas $E_F$.

Furthermore, it is possible to also fold the cover parts 60 and 62 about the cover folding axis 64, for example, such that a lower side 100 of the cover part 62 is located on a lower side 102 of the cover part 60.

In order to configure the folding of the cover parts 60 and 62 as simply as possible, the cover folding axis 64 is located in a line of intersection of the surface areas defined by the lower sides 100 and 102.

The wind blocker folding axis 44 and the cover folding axis 64 are preferably placed such that the wind blocker folding axis 44 and the cover folding axis 64 are essentially located one above the other and extend at a distance parallel to one another when a wind blocker 12 is folded onto the cover 16 about the connection folding axis 90 so that the frame support parts 32a, b and 34a, b as well as the outer connecting supports 36 and 38 are likewise located on top of one another when wind blocker parts 52 and 50 are folded onto one another, as illustrated in FIG. 5.

Furthermore, the cover 16 is likewise designed such that the frame sections 85a and 85b are likewise located essentially congruently on top of one another.

The wind blocker parts 50 and 52 as well as the cover parts 60 and 62 are preferably essentially of approximately the same size and same shape so that in the completely folded state of the inventive wind stop device a stack can be formed, with which two cover parts, namely the cover parts 60 and 62, are, first of all, located on top of one another and two wind blocker parts 50 and 52 located above one another are located on them.

In order to place the wind blocker parts 52 and 50 as well as the cover parts 60 and 62 on top of one another, an at least releasable connection between the wind blocker part 52 and the cover part 62 is preferably provided, with which the lower frame support part 32b extending in the wind blocker part 52 can be secured to the front frame support part 72b extending in the cover part 62 in a releasable manner.

In contrast thereto, the wind blocker part 50 is preferably securely connected to the cover part 60 via a hinge 104, the hinge axis of which coincides with the connection folding axis 90.

The releasable connection between the wind blocker part 52 and the cover part 62 is preferably brought about via a locking unit 110 which has a locking bolt 114 which can be displaced in a direction 112 parallel to the front frame support part 72b, is part of the fixing device 24 and serves to fix the wind stop device to the body 10 (FIG. 6). At the same time, the locking bolt 114 is, however, displaceable in the direction of the cover folding axis 64 such that the locking bolt 114 can be brought into or out of engagement with a hook 116 which is held on the frame support part 32b and through which the locking bolt 114 extends in the connected state of the wind blocker part 52 to the cover part 62 so that the hook 116 and the locking bolt 114 form a hinge between the wind blocker part 52 and the cover part 62, the hinge axis of which is located coaxially to the connection folding axis 90.

Such a hinge may, however, be formed from the hook 116 and the locking bolt 114 only when the locking bolt 114 is arranged coaxially to the connection folding axis 90 and the hook 116 is coaxial to the connection folding axis 90 which can be achieved only when the wind blocker parts 50 and 52 as well as the cover parts 60 and 62 are each folded about the corresponding folding axes 44 and 64 to such an extent that they are in their extended position and, for example, the wind blocker 12 and the cover 16 are located on top of one another or at least the lower frame support 32 extends parallel to the front frame support 72.

The fixing device 22 also preferably has a locking bolt 118 which can likewise engage in a corresponding recess in the body 10 in order to fix the wind stop device on it.

In a second embodiment of a wind stop device, illustrated in FIGS. 7 to 10, those parts which are identical to those of the first embodiment are given the same reference numerals and so with respect to their description reference is made in full to the comments on the first embodiment.

In contrast to the first embodiment, the cover 16 has a cover frame 70' which is formed merely from the front frame support 72, the rear frame support 74 and the outer connecting supports 76 and 78 and is thus of a similar construction to the wind blocker frame 30. For this reason, the front frame support 72 and the rear frame support 74 are provided with the outer connecting supports 76 and 78 so that the cover frame 70' has a uniform frame opening 86', in which the flat material 88 is held so as to be tensioned.

Thus, the cover frame 70' likewise comprises two C-shaped frame sections 85a', 85b' which adjoin the cover folding axis 64 with their open sides.

To simplify the folding about the folding axis 64, the flat material 88 is located in each frame section 85a, 85b in a surface area, preferably a plane $E_U$, which coincides with the lower sides 100 and 102 of the cover parts 60, 62 and the cover folding axis 64 is located in a line of intersection of these surface areas $E_U$.

As for the rest, the wind blocker 12 comprises two wind blocker parts 50 and 52 and the cover 16 two cover parts 60 and 62 which, as illustrated in FIGS. 8 to 10, can be folded in the same way and about the same axes as described in detail in conjunction with the first embodiment.

In the second embodiment, the wind blocker frame 30 and the cover frame 70 are, in particular and in principle, of an identical construction so that in the folded state illustrated in FIG. 10 a uniform picture preferably results.

Figure 11:
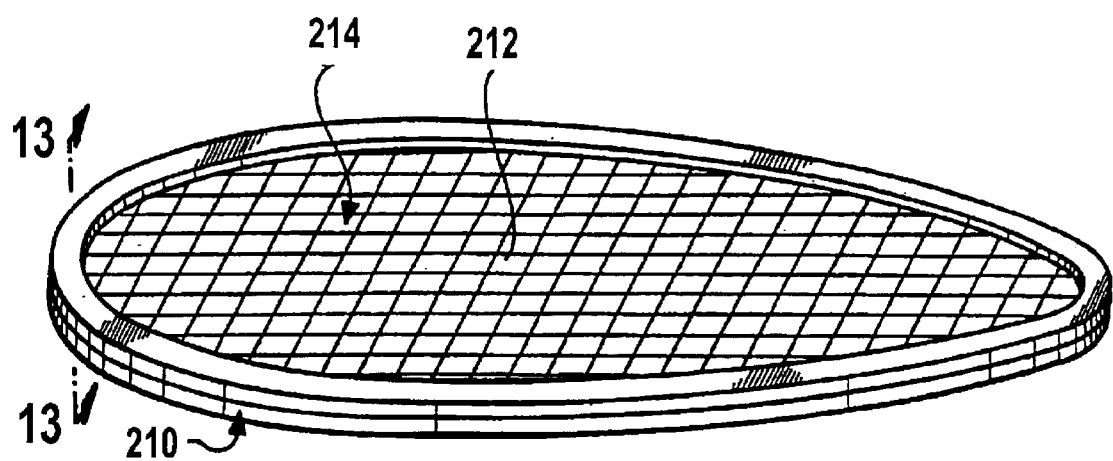
FIG. 11 a perspective illustration of a first embodiment of a screen element according to the present invention.

A first embodiment of a screen element according to the invention, shown in FIG. 11, which can be used as wind blocker part 50, 52 of wind blocker 12 in the wind stop device described before or as cover parts 60, 62 of cover 16 of said windstop device, comprises a frame 210 which encloses an area 212 over which a piece of flat material 214 extends.

Figure 12:
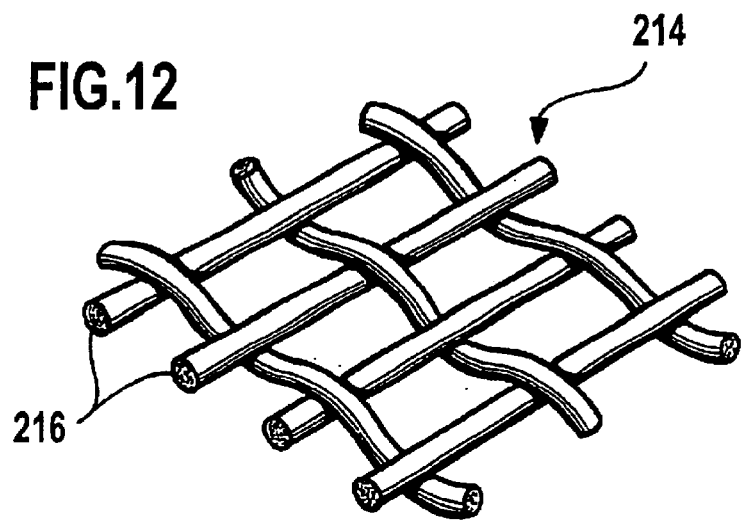
FIG. 12 a partially enlarged illustration of the piece of flat material.

The piece of flat material 214 is, as shown schematically in FIG. 12, made from a woven or knitted fabric consisting of inherently stiff wires or fibers 216, preferably metal wires, and is, therefore, not flexible, but has an inherent rigidity.

As shown in FIG. 13, in the first embodiment the piece of flat material 214, which extends in a surface area 218 in the area 212 enclosed by the frame, is bent over at an edge area 220 such that the latter extends transversely to the surface area 218. This edge area 220 lies in a recess 222 of the frame 210, which is comprised of two frame parts 224a and 224b, and the recess 222 is provided as free space between these frame parts 224a and 224b for receiving the edge area 220.

The frame parts 224a and 224b each abut with bearing surfaces 226a and 226b on the piece of flat material 14 and fix it in a bearing area 28 of the edge area 220. Starting from this bearing area 228 a bent over area 230 of the edge area 220 extends into the recess 222.

The two frame parts 224a and 224b are preferably provided with further bearing surfaces 232a and 232b, with which they abut directly on one another, and in the area of which a permanent connection between the frame parts 224a and 224b can be made in many different ways.

One possibility for a permanent connection in the area of the bearing surfaces 232a and 232b is that of adhering the frame parts 224a and 224b.

Another possibility is that of joining the frame parts 224a and 224b together in the area of the bearing surfaces 232a and 232b by ultrasonic welding or some other type of welding.

In the case of ultrasonic welding a precondition is that at least one of the frame parts 224a and 224b is made of a thermoplastic material so that at least in individual areas a heating-up and softening of the thermoplastic material can be carried out ultrasonically and the two frame parts 224a and 224b can then be joined to each other due to this softening.

In a second embodiment of a screen element according to the invention, shown in FIG. 14, the piece of flat material 214 is not bent over at the edge area 220, but the edge area 220 extends in continuation of the surface area 218 over a frame part 240 of the frame 210 and rests on a surface 242 of the frame part 240.

If the frame part 240 is provided with energy directing elements 244 lying over the surface 242, it is possible by the application of a sonotrode and the action of ultrasound, if the energy directing elements 244 consist of a thermoplastic material, to heat up and soften the thermoplastic material in the area of the energy directing elements 244 so that a plastic melt is formed, into which the edge area 220 of the piece of flat material 214 is then embedded with the wires 216 so that after solidification of the plastic melt the wires are embedded in a positively locking manner in a material agglomeration 246 formed by softening the energy directing elements 244.

Figure 15:
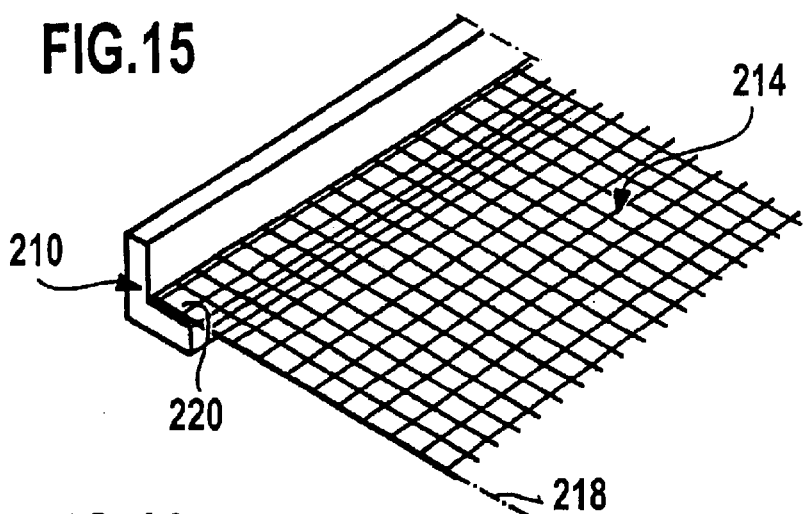
FIG. 15 a section similar to FIG. 13 through a third embodiment.

In a third embodiment of the screen element according to the invention, shown in FIG. 15, the dimensional and inherent rigidity of the piece of flat material 214 is put to advantageous use.

In this third embodiment, the edge area 220 of the piece of flat material 214 preferably likewise extends in the direction of the plane 218 and is provided with the frame 210 by the material forming the frame 210 being formed on the edge area 220 by injection molding or foaming it around the edge area 220 so that the edge area 220 is embedded in the material forming the frame 210 and a positively locking connection is thus created between the edge area 220 and the material which is injection molded or foamed around it so as to form the frame 210.

With this solution, if the material forming the frame 210 is a very soft material, the frame 210 can then make only a slight or insignificant contribution to the stability of the screen element so that the stability of the screen element primarily results from the inherent rigidity of the wires 216 of the piece of flat material 214.

Figure 16:
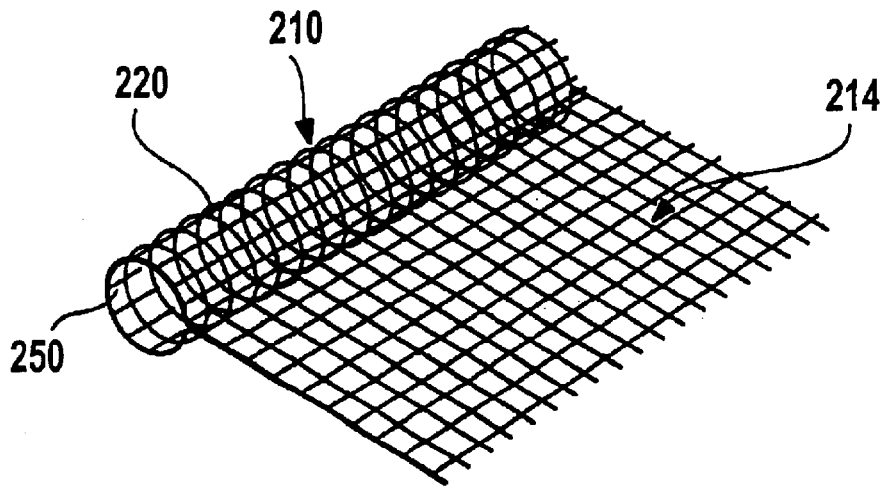
FIG. 16 a section similar to FIG. 13 through a fourth embodiment.

In a fourth embodiment, shown in FIG. 16, in order to improve the stiffness of the edge area of the piece of flat material 214, the edge area is shaped by bending over, for example, wrapping over the edge area 220, to form a loop 250 which results in an edge rigidity in addition to the inherent stiffness of the piece of flat material 214.

This bending of the edge area 220 can be protected solely by a simple sheathing or also by injection molding around it. With appropriate machining of the wires 216, it is, however, also conceivable to provide solely the bent over edge area 220 as frame.

Figure 17:
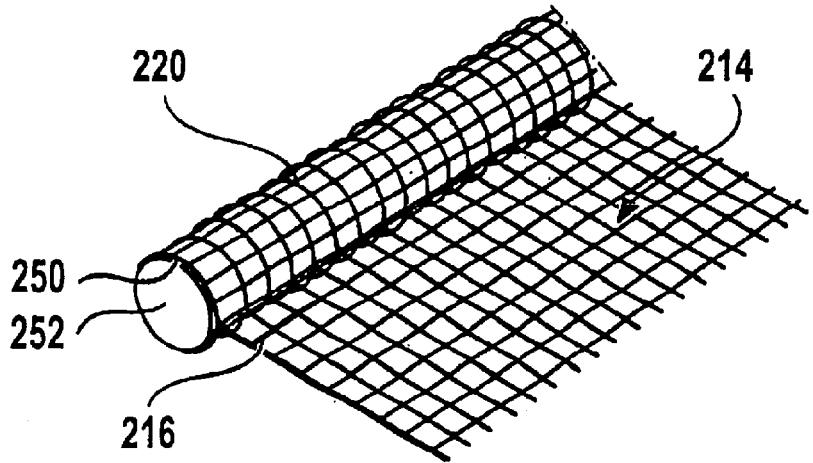
FIG. 17 a section similar to FIG. 13 through a fifth embodiment.

In a fifth embodiment, shown in FIG. 17, in a modification of the fourth embodiment, shown in FIG. 16, a piping 252 which contributes towards additional stiffening and stabilization of the edge area is inserted into the bent over edge area 220.

Figure 18:
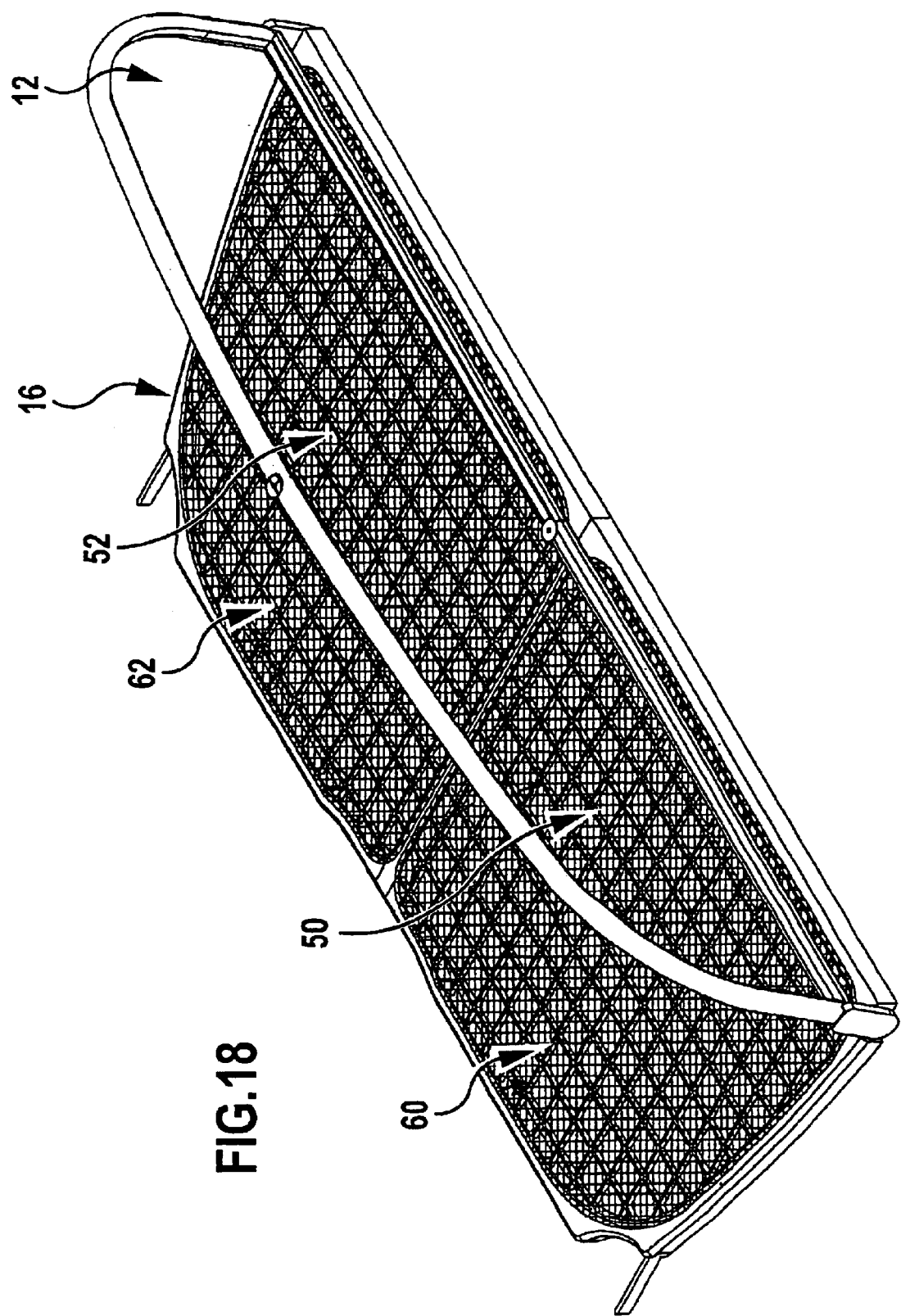
FIG. 18 a perspective illustration of a sixth embodiment of a screen element according to the invention.

In a windstop device as described hereinabove and shown in a further embodiment in FIG. 18 a sixth embodiment of a screen element is used to form the cover part 60, 62 of cover 16.

However, the sixth embodiment can also be used as the wind blocker part 50, 52 of wind blocker 12.

In the sixth embodiment of the screen element a stabilizing structure 260 is provided and comprises an outer rim element 262 corresponding with its outer contour to the outer contour of the respective wind blocker part 50, 52.

The stabilizing structure 260 further comprises a web structure 264 extending within a surface area 266 enclosed by the outer rim element 262 and being connected to the outer rim element 262 such that the web structure 264 provides stability to the outer rim element 262.

Preferably, the outer rim element 262 and the web structure 264 are formed as an integral part, for example, by injection molding, such that form stability of the outer rim element 262 is maintained by first webs 268 extending in a first direction 270 and second webs 272 extending in a second direction 274, with the second direction 274 extending transversely to the first direction 270.

Preferably, the first webs 268 extending parallel to the first direction 270 are arranged at a constant distance from each other within surface area 266 and the second webs 272 extending parallel to the second direction 274 are also arranged at a certain distance from each other within surface area 266.

In the sixth embodiment first webs 268 and second webs 272 form a grid with all webs 268 and 272 being connected to each other and to rim element 262. For optimum stability of the stabilizing structure 260 the first directions 270 and second directions 274 extend essentially in the longitudinal directions of rim supports 280, 282, 284 and 286 which are connected to each other in order to form rim element 262.

Preferably, the first and second directions 270, 274 extend with respect to the longitudinal direction of rim supports 280, 282, 284 and 286 at an angle lying in a range of between about 20° and 70° in order to obtain good stabilization of rim element 260.

Preferably, first webs 268 and second webs 272 extend as crossovers such as beams or rods or bars or legs between two respective ones of the rim supports 280, 282, 284 and 286, preferably between subsequent rim supports 280, 282; 282, 284; 284, 286; 286, 280 of said rim supports 280, 282, 284 and 286.

Further first webs 268 and second webs 272 are arranged such that there are wide openings 290 between these webs 268, 272 with the sum of the areas of the openings 290 corresponding to more than 90%, preferably more than 95% of surface area 266 enclosed by the rim element 262. In such a design the web structure 264 is not wind-tight.

Preferably, the first and second webs 268, 272 are interconnected at the points of intersection 292 in order to improve stability of the entire web structure 264.

Furthermore, all webs 268, 272 of the web structure 264 are made of an inherently stiff material extending without any tension between rim supports 280, 282, 284, 286.

The sixth embodiment of the screen element further comprises a piece of flat material 294 with bending slackness which can be fixed to stabilizing structure 260. One possibility would be to fix an outer edge portion 296 of flat material 294 to rim element 262 of stabilizing structure 260 by glueing or welding.

Figure 19:
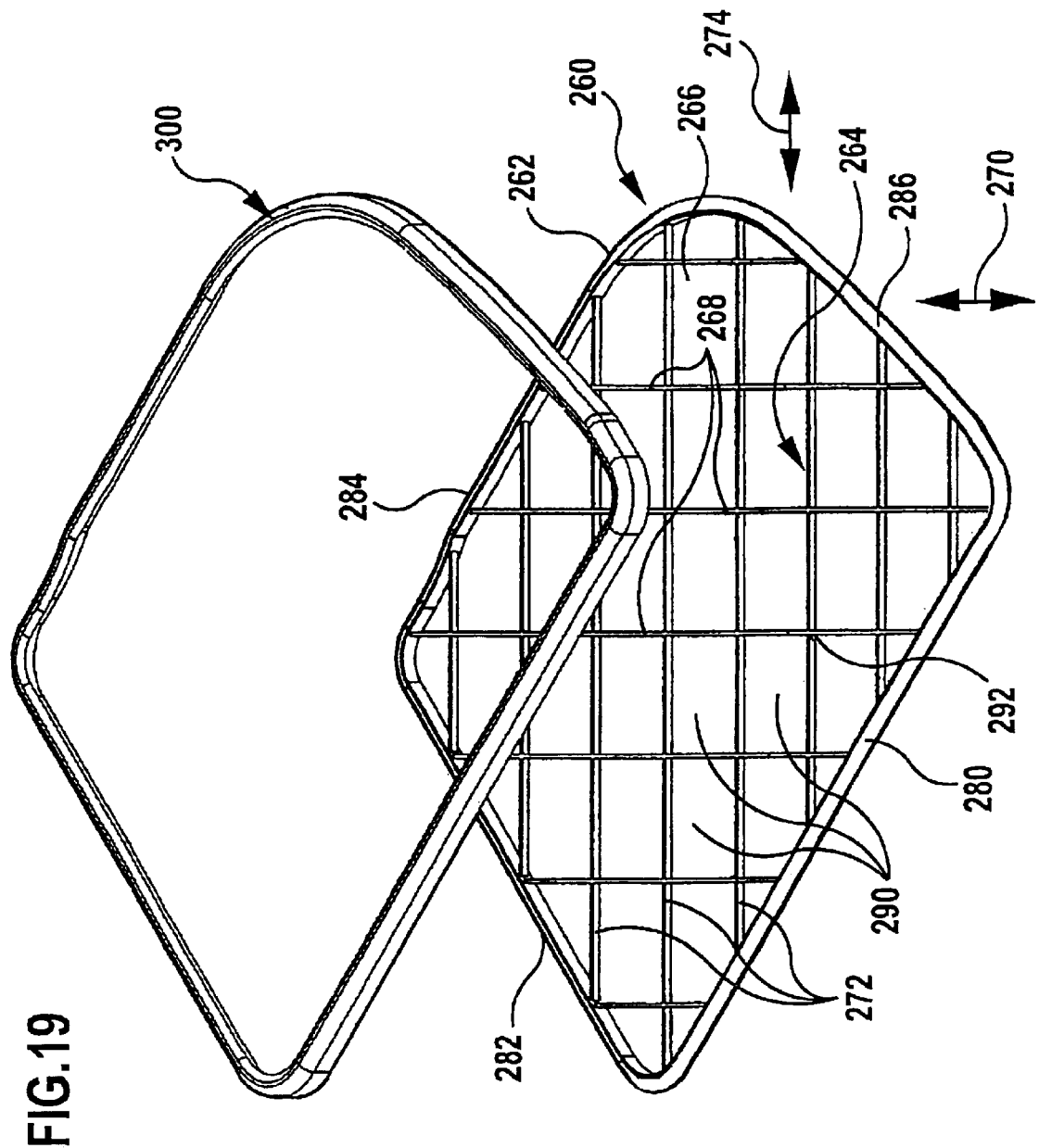
FIG. 19 a perspective representation of a stabilizing structure of said sixth embodiment.
Figure 20:
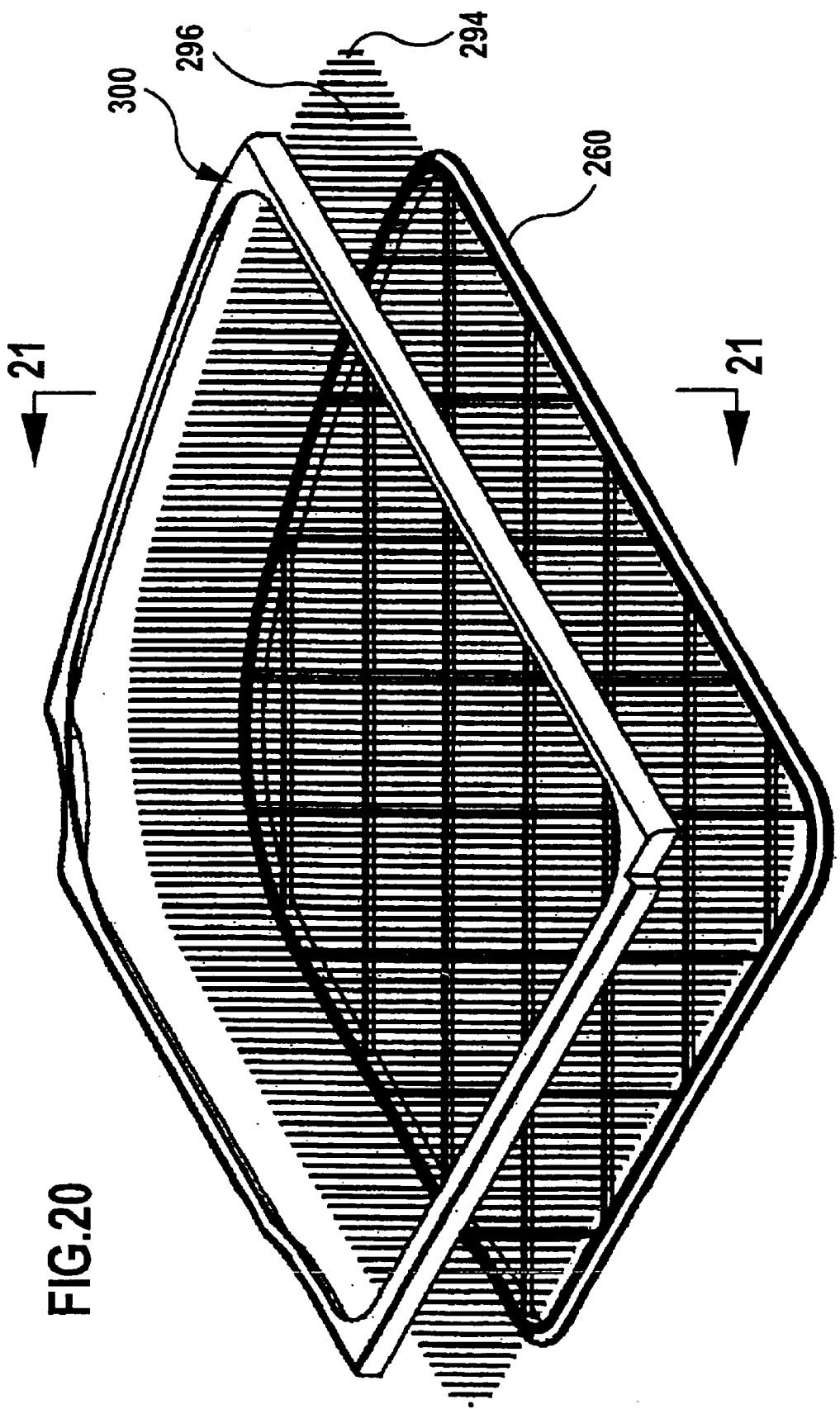
FIG. 20 a representation of unassembled elements of said sixth embodiment of the screen element and FIG. 21 a sectional view along lines 21—21 of an assembled screen element according to the sixth embodiment.

In the sixth embodiment shown in FIGS. 19 and 20 fixing of flat material 294 is performed by providing two frame parts, one frame part being rim element 262 and another frame part being cover element 300, which together form an outer frame 302 as shown in FIG. 22 when fixed relative to each other. Outer frame 302 fixes outer edge portion 296 by clamping.

Preferably, outer rim element 262, as shown in FIG. 22, is provided with a groove 304 forming receiving means within which outer edge portion 296 of flat material 294 is held by a protrusion 306 provided on cover element 300. Protrusion 306 is formed so as to be force-locked within groove 304 when outer edge portion 296 is pressed into groove 304 by protrusion 306.

Cover element 300 further comprises an outer cover portion 308 extending over and covering groove 304 and also covering outer rim 262 on its outer side opposite to the side from which web structure 264 extends.

In the preferred embodiment, outer rim 262 is further provided with an outer edge 310 covered by cover portion 308, whereas cover portion 308 on its side adjacent outer edge 310 is provided with a protrusion 312 arranged on a side of outer edge 310 opposite to groove 304, so that when cover portion 308 is mounted on outer rim 262 with protrusion 306 extending into groove 304, protrusion 312 when abutting on the side of outer edge 310 opposite groove 304 prevents cover portion 308 from movement in a direction which would allow protrusion 306 to move out of groove 304.

Consequently, outer rim element 262 and cover element 308 are fixed with respect to each other by form-locking between protrusion 306 and groove 304 and between protrusion 312 and outer edge 310.

Outer rim element 262 is further provided with a guiding surface 314 arranged on the side of groove 304 facing surface area 266 enclosed by outer rim element 262 so that flat material 294 is supported by guiding surface 314 so as to extend in a surface 316 defined by guiding surface 314.

Furthermore, web structure 264 extends in a surface 318 arranged essentially parallel to guiding surface 314 so that web structure 264 extends on one side of flat material 294.

In the preferred embodiment, surfaces 316 and 318 are arranged at such a distance that flat material 294 extends free of contact with web structure 264, preferably so that there is a free space between web structure 264 and flat material 294.

However, it would be possible to arrange guiding surface 314 of outer rim 262 above web structure 264 so as to have the flat material 294 abutting on one side of web structure 264.

In the preferred embodiment shown in FIG. 22 flat material 294 is made of a tensionable material so that tensioning of flat material 294 occurs when outer edge portion 296 of flat material 294 is squeezed into groove 304 by protrusion 306 in order to provide a perfect flat optical appearance of flat material 294.

Flat material 294, in particular when used for cover part 60, 62, can be made of air-tight material.

However, a preferred embodiment provides an air-permeable flat material 294, in particular made of a woven, knitted or braided fabric or a perforated foil.

To assemble the screen element according to the sixth embodiment, flat material 290 is disposed on stabilizing structure 260, and cover element 300 is arranged on a side of flat material 294 opposite the side on which stabilizing structure 260 is arranged.

By pressing cover element 300 onto rim element 262 of stabilizing structure 260, flat material 294 is fixed by its outer edge portions 296 being clamped in groove 304 by protrusion 306, as described above, and being tensioned. Furthermore, cover element 300 is fixed on rim element 262 if protrusion 312 is arranged on a side of outer edge 310 opposite groove 304.

Figure 21:
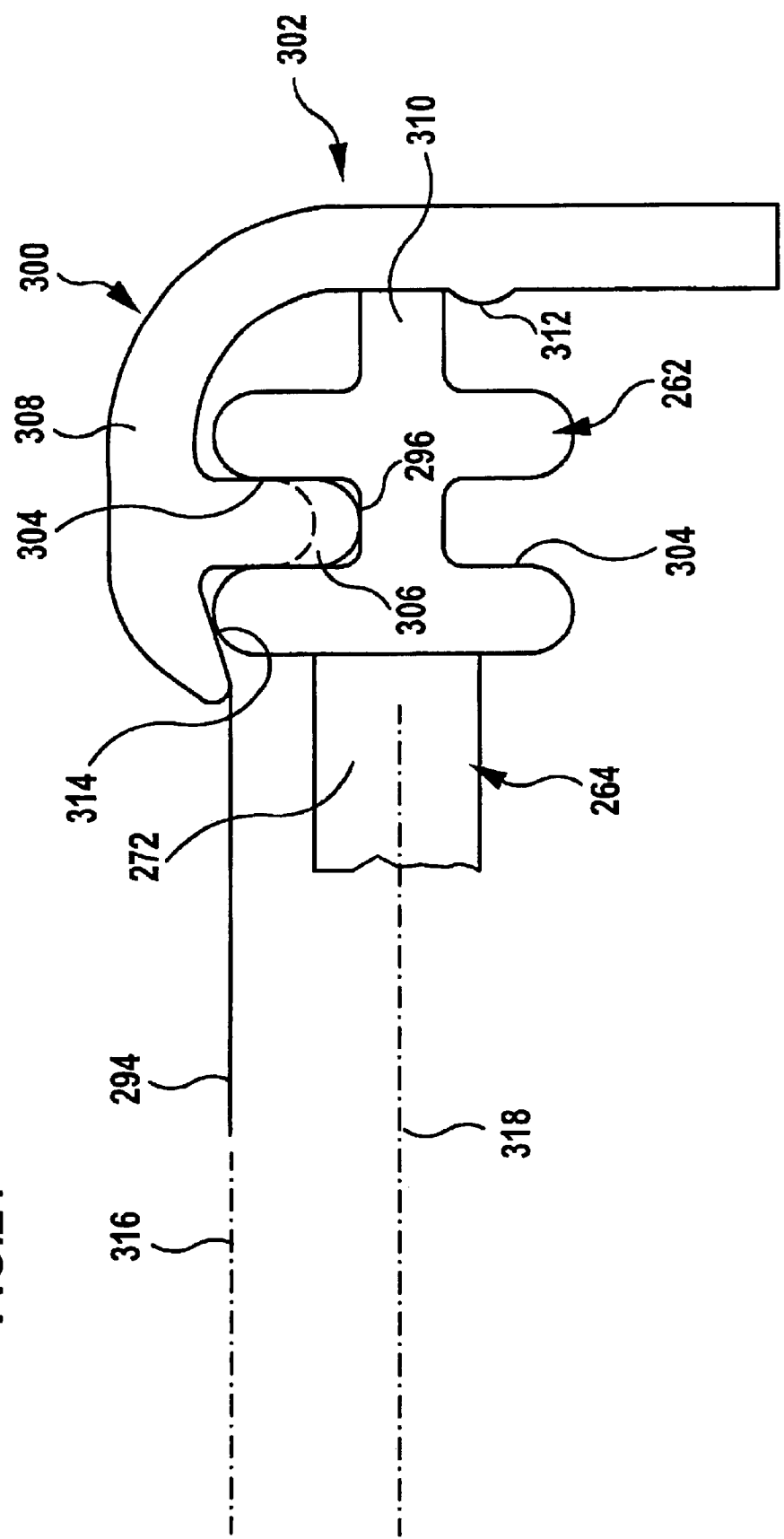

As can be further seen from FIG. 21, rim element 262 is provided with grooves 304 on opposite sides so that cover element 300 and flat material 294 can be mounted from both sides.

What is claimed is:

1. A windstop device for a convertible comprising:
    a wind blocker adapted to be arranged behind headrests of seats of said convertible and projecting upward beyond a belt line of said convertible, said wind blocker comprising a screen element, said screen element having:
        a stabilizing structure extending in a surface area, said stabilizing structure comprising a web structure having openings between webs thereof and providing stability to said screen element, and
        a piece of flat material extending in said surface area, said stabilizing structure maintaining said piece of flat material in a position in which the piece of flat material extends over said surface area within an outer contour of said stabilizing structure;
    at least one connection between the stabilizing structure and the piece of flat material for keeping the piece of flat material extended in said surface area; and
    fixing means for fixing said windstop device to said convertible.

2. A windstop device in accordance with claim 1, wherein said stabilizing structure comprises an outer rim element connected to said web structure.

3. A windstop device in accordance with claim 2, wherein said piece of flat material is fixed to said rim element of said stabilizing structure.

4. A windstop device in accordance with claim 2, wherein said rim is provided with a receiving means for an outer edge portion of said piece of flat material.

5. A windstop device in accordance with claim 4, wherein said outer edge portion of said piece of flat material is retained in said receiving mean by an insert.

6. A windstop device in accordance with claim 5, wherein said insert is part of a cover element.

7. A windstop device in accordance with claim 1, wherein said stabilizing structure comprises an outer frame connected to said web structure.

8. A windstop device in accordance with claim 1, wherein said webs are interconnected with each other.

9. A windstop device in accordance with claim 8, wherein said webs are interconnected at points of intersection thereof.

10. A windstop device in accordance with claim 8, wherein at least some of said webs extend parallel to each other.

11. A windstop device in accordance with claim 10, wherein a first number of webs extend parallel to one direction and a second number of webs extend parallel to a second direction, said second direction extending transversely to said first direction.

12. A windstop device in accordance with claim 11, wherein said first and second directions extend transversely to rim supports forming said rim element.

13. A windstop device in accordance with claim 1, wherein said stabilizing structure comprises crossovers forming said webs of said web structure.

14. A windstop device in accordance with claim 1, wherein said web structure is formed as an integral part.

15. A windstop device in accordance with claim 14, wherein said stabilizing structure is formed as an integral part.

16. A windstop device in accordance with claim 1, wherein said web structure extends on at least one side of said piece of flat material.

17. A windstop device in accordance with claim 1, wherein said flat material extends in a first surface and said web structure extends in a second surface which is different from said first surface.

18. A windstop device in accordance with claim 17, wherein said first surface and said second surface extend essentially parallel to each other.

19. A windstop device in accordance with claim 1, wherein said piece of flat material is made of a material with bending slackness.

20. A windstop device in accordance with claim 1, wherein said piece of flat material is a wind-tight material.

21. A windstop device in accordance with claim 1, wherein said piece of flat material is made of an air-permeable material provided with openings.

22. A windstop device in accordance with claim 21, wherein said openings in said piece of flat material are smaller than said openings in said web structure.

23. A windstop device in accordance with claim 1, wherein said piece of flat material comprises at least one of a woven, knitted, and braided fabric.

24. A windstop device in accordance with claim 1, wherein said piece of flat material comprises a foil provided with openings.

25. A windstop device in accordance with claim 1, wherein said piece of flat material is made of elastic material which can be tensioned in at least one direction.

26. A windstop device in accordance with claim 1, wherein said piece of flat material is an inelastic material.

27. A windstop device for a convertible comprising:
    a wind blocker adapted to be arranged behind headrests of seats of said convertible and projecting upward beyond a belt line of said convertible;
    a cover adapted to cover a section behind said wind blocker;
    at least one of said wind blocker and said cover comprising a screen element, said screen element having:
        a stabilizing structure extending in a surface area, said stabilizing structure comprising a web structure having openings between webs thereof and providing stability to said screen element; and
        a piece of flat material extending in said surface area, said stabilizing structure maintaining said piece of flat material in a position in which the piece of flat material extends over said surface area within an outer contour of said stabilizing structure;

at least one connection between the stabilizing structure and the piece of flat material for keeping the pieces of flat material extended in said surface area; and fixing means for fixing said windstop device to said convertible.

28. A windstop device in accordance with claim 27, wherein said piece of flat material is a wind-tight material.

29. A windstop device in accordance with claim 27, wherein said piece of flat material is made of an air-permeable material provided with openings.

30. A sun screen for motor vehicles, comprising:

a stabilizing structure extending in a surface area, said stabilizing structure comprising a web structure having openings between webs thereof and providing stability to said sun screen;

a piece of flat material extending in said surface area and made of at least one of an air permeable material with openings and a sun-screening material, said stabilizing structure maintaining said piece of flat material in a position in which the piece of flat material extends over said surface area within an outer contour of said stabilizing structure; and at least one connection between the stabilizing structure and the piece of flat material for keeping the piece of flat material extended in said surface area.

31. A windstop device for a convertible, comprising:

at least one wind blocking screen adapted to be arranged behind headrests of seats of said convertible and projecting upward beyond a belt line of said convertible, said wind blocking screen comprising:

a stabilizing structure extending in a surface area, said stabilizing structure comprising a web structure having openings between webs thereof and providing stability to said screen, and a piece of wind blocking flat material extending in said surface area, said stabilizing structure maintaining said piece of flat material in a position in which the piece of flat material extends over said surface area within an outer contour of said stabilizing structure; and at least one connection between the stabilizing structure and the piece of flat material for keeping the piece of flat material extended in said surface area.

32. A windstop device in accordance with claim 31, wherein said piece of flat material is a wind-tight material.

33. A windstop device in accordance with claim 31, wherein said piece of flat material is made of an air-permeable material provided with openings.

* * * * *